(12) United States Patent
Shirai et al.

(10) Patent No.: US 6,178,465 B1
(45) Date of Patent: Jan. 23, 2001

(54) IMAGE PROCESSORS FOR READING AND OUTPUTTING DATA

(75) Inventors: Yasuyuki Shirai, Oume; Chiharu Wakabayashi, Fussa, both of (JP)

(73) Assignee: Casio Computer Co., Ltd., Tokyo (JP)

( * ) Notice: Under 35 U.S.C. 154(b), the term of this patent shall be extended for 0 days.

(21) Appl. No.: 08/894,607
(22) PCT Filed: Dec. 2, 1996
(86) PCT No.: PCT/JP96/03519
  § 371 Date: Aug. 6, 1997
  § 102(e) Date: Aug. 6, 1997
(87) PCT Pub. No.: WO97/21193
  PCT Pub. Date: Jun. 12, 1997

(30) Foreign Application Priority Data

Dec. 7, 1995  (JP) .................................................. 7-344707

(51) Int. Cl.⁷ ...................................................... G06F 3/00
(52) U.S. Cl. ...................... 710/1; 707/104; 382/284; 382/306
(58) Field of Search ................................. 707/1, 7, 104; 710/1; 382/305, 306, 190, 284; 386/46, 66

(56) References Cited

U.S. PATENT DOCUMENTS

| 4,338,637 | * | 7/1982 | Ueno .................................... 358/468 |
| 5,126,933 | * | 6/1992 | White, III ........................ 364/148.02 |
| 5,257,327 | * | 10/1993 | Hirosawa ............................. 382/235 |
| 5,317,508 | * | 5/1994 | Okamoto et al. ................ 364/419.01 |
| 5,608,858 | * | 3/1997 | Kurosu et al. ......................... 707/502 |
| 5,612,742 | * | 3/1997 | Krause et al. ......................... 348/385 |
| 5,684,999 | * | 11/1997 | Okamoto ................................. 704/9 |
| 5,694,331 | * | 12/1997 | Yammamoto et al. .............. 345/428 |
| 5,701,500 | * | 12/1997 | Ikeo et al. ............................. 707/517 |
| 5,775,998 | * | 7/1998 | Ikematsu et al ........................ 463/52 |

FOREIGN PATENT DOCUMENTS

| 0 657 828 A1 | * | 6/1995 | (JP) ................................ G06F/17/30 |
| 0 669 600 A2 | * | 8/1995 | (JP) ................................ G06T/11/00 |

OTHER PUBLICATIONS

S. Inoue et al; "Component Image Filing System for Image Synthesis"; 1990 pp. 86–95; Systems and Computers in Japan, vol. 21, No. 7.

* cited by examiner

Primary Examiner—Ario Etienne
(74) Attorney, Agent, or Firm—Frishauf, Holtz, Goodman, Langer & Chick, P.C.

(57) ABSTRACT

An image processor which reads and outputs image data. Only by inputting a keyword which causes us to associate an image intuitively, the image processor produces and outputs an image based on a plurality of image data combined on the basis of the input keyword. To this end, an illustration part keyword table contains a plurality of keywords and a plurality of illustration part codes for each keyword. A part arrangement table contains a plurality of image pointer values and their arrangement information in correspondence to illustration part codes. A CPU searches the illustration part keyword table and part arrangement table for a match of the input keyword and reads a plurality of illustration image data corresponding to the keyword from an illustration part image file and arranges the respective illustration images in accordance with the corresponding arrangement information.

10 Claims, 12 Drawing Sheets

| KEYWORD | STANDARD PART IMAGE | ANIMATION STYLE PART IMAGE | SOLEMN STYLE PART IMAGE | JAPANESE STYLE PART IMAGE | EUROPEAN STYLE PART IMAGE |
|---|---|---|---|---|---|
| WEDDING RECEPTION | GOLDEN FOLDING SCREEN A | GOLDEN FOLDING SCREEN B | GOLDEN FOLDING SCREEN C | GOLDEN FOLDING SCREEN D | GOLDEN FOLDING SCREEN E |
| | BRIDEGROOM A | BRIDEGROOM B | BRIDEGROOM C | BRIDEGROOM D | BRIDEGROOM E |
| | BRIDE A | BRIDE B | BRIDE C | BRIDE D | BRIDE E |
| BRIDEGROOM | BRIDEGROOM A | BRIDEGROOM B | BRIDEGROOM C | BRIDEGROOM D | BRIDEGROOM E |
| | -- | -- | -- | -- | -- |
| DONUT EATING RACE | ENTRANCE GATE A | | | | |
| | TUMBLING CHILD A | | | | |
| | RUNNING CHILD 1A | | | | |
| | RUNNING CHILD 2A | | | | |
| | DONUT EATING RACE A | | | | |
| PRESENTA-TION | SCREEN A | | | | |
| | MALE 1A | | | | |
| | DESK A | | | | |
| CHERRY BLOSSOM VIEWING | CHERRY TREE A | | | | |
| | TARPAULIN A | | | | |
| | FEMALE A | | | | |

FIG.5

| INPUT CHARACTER STRING | EXPRESSION FORM |
|---|---|
| CUTE | ANIMATION STYLE |
| POP | 〃 |
| ANIMATION STYLE | 〃 |
| CARTOON STYLE | 〃 |
| NOBLE | SOLEMN STYLE |
| SOLEMN STYLE | 〃 |
| JAPANESE STYLE | JAPANESE STYLE |
| ANCIENT STYLE | 〃 |
| NIPPON STYLE | 〃 |
| NIHON STYLE | 〃 |
| EUROPEAN STYLE | EUROPEAN STYLE |
| WESTERN STYLE | 〃 |
| ⋮ | ⋮ |

| PART IMAGE | ORDER OF ARRANGEMENT | POSITION OF ARRANGEMENT | IMAGE POINTER |
|---|---|---|---|
| GOLDEN FOLDING SCREEN A | 1(ST) | CENTER | |
| GOLDEN FOLDING SCREEN B | 1(ST) | CENTER | |
| GOLDEN FOLDING SCREEN C | 1(ST) | CENTER | |
| ⋮ | | | |
| BRIDEROOM A | 2(ND) | LEFT | |
| BRIDEROOM B | 2(ND) | LEFT | |
| ⋮ | | | |
| BRIDE A | 2(ND) | RIGHT | |
| BRIDE B | 2(ND) | RIGHT | |
| ⋮ | | | |
| ENTRANCE GATE A | 1(ST) | CENTER | |
| TUMBLING CHILD | 2(ND) | LEFT | |
| ⋮ | | | |
| SCREEN A | 1(ST) | LEFT | |
| ⋮ | | | |

14

FIG.8A
"EUROPEAN STYLE WEDDING RECEPTION"
ILLUSTRATION:
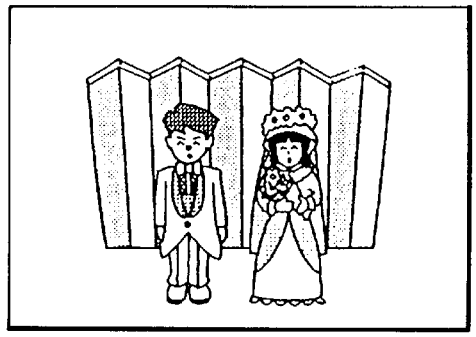
FIG.8B
"DONUT EATING RACE"
ILLUSTRATION:
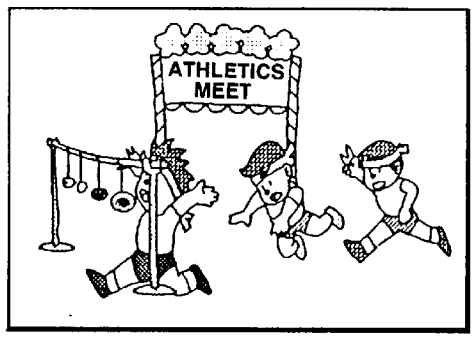
ILLUSTRATION PART IMAGE FILE
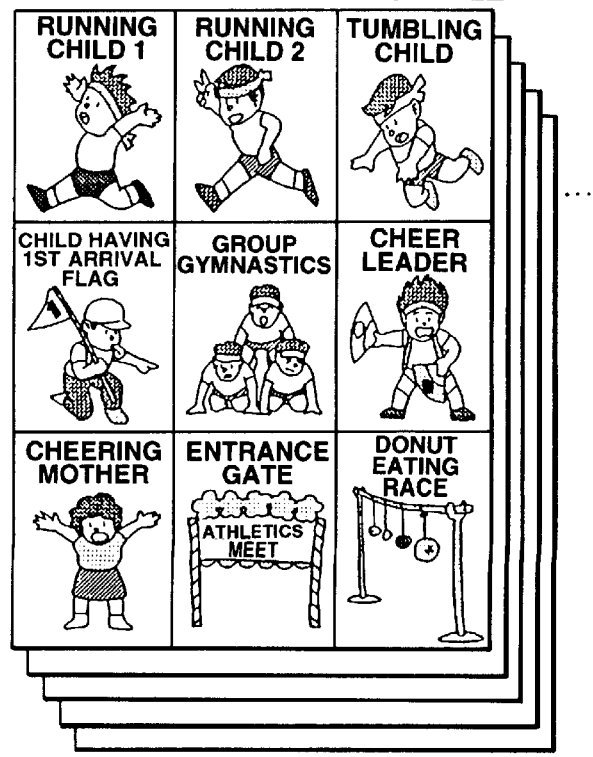

"EUROPEAN STYLE WEDDING RECEPTION"

CHANGED TO ILLUSTRATION

ILLUSTRATION (UNCHANGED):

"A BRIDE AND A BRIDEGROOM ARE DRESSED IN JAPANESE STYLE"

ILLUSTRATION (CHANGED):

ILLUSTRATION (UNCHANGED):

"AN OWL IN A ZOO"

CHANGED TO ILLUSTRATION

"CUTE"

ILLUSTRATION (CHANGED):

ILLUSTRATION:

"AN ALLIGATOR IN A ZOO"

CHANGED TO ILLUSTRATION

IMAGE PROCESSORS FOR READING AND OUTPUTTING DATA

TECHNICAL FIELD

The present invention relates to image processors which includes a word processor or a personal computer which reads any specified image data from among various image data prepared beforehand and outputs them.

BACKGROUND ART

Conventionally, letters of invitation are created which have a persuasive power and/or delightfulness improved by inserting into a document illustration images related to the document contents and selected from among various illustrations prepared beforehand. The illustration images are stored one in each file. In this case, an illustration image is called by selecting a desired file name from among a displayed list of file names.

When the user calls an illustration image, she has beforehand determined which illustration is most effective to insert into a document. However, it is difficult to known an illustration image intuitively from its file name. Many illustration images are required to be called many times until a desired illustration image is retrieved, so that much time is consumed. However, it may be that the desired illustration image has not necessarily been stored, and an illustration image which satisfies the user to some extent would be required to be selected inevitably.

An image processor is known in which the user selects and combines a plurality of illustration images at her choice into a desired illustration image. Also, in this case, much time is consumed for selecting illustration images, and the order of combining the illustration images and the positions of arranging those illustrations are required to be specified for the respective illustration images. This combining work also consumes much time.

It is therefore an object of the present invention to produce, only by inputting a keyword which causes us an association an image, a combined image composed of a plurality of image data on the basis of the input keyword.

DISCLOSURE OF THE INVENTION

According to the present invention, there is provided an image processor which reads and outputs image data, comprising:

image storage means which contains a plurality of keywords, a plurality of image data for each keyword and arrangement information for arranging a plurality of image data;

inputting means for inputting a keyword to the image processor;

reading means for reading from said image storage means a plurality of image data and arrangement information corresponding to the keyword input by said inputting means; and outputting means for arranging and combining the plurality of image data read by said reading means in accordance with the arrangement information and for outputting the resulting image.

Thus, according to the present invention, only by inputting a keyword which causes us to associate an image intuitively, a combined image composed of a plurality of image data on the basis of the input keyword is produced and output. Therefore, a desired image is obtained in a simple operation.

BRIEF DESCRIPTION OF THE DRAWINGS

FIG. 4 illustrates a part of an illustration part keyword table;

FIG. 5 illustrates a portion of a display form conversion table;

FIG. 6 illustrates a portion of a part image arrangement table;

FIGS. 8A and 8B each illustrate a synthetic illustration image converted from an input character string in the character string-to-illustration conversion, wherein FIG. 8A shows an illustration image to which a character string "European-style wedding reception" is converted when input, and FIG. 8B shows an illustration image to which a character string "donut eating race" is converted when input;

FIGS. 10A–10C show the situation in which when the expression form has been changed, the present illustration image is displayed and output in a style of expression based on the expression form changed previously, wherein FIG. 10A shows the illustration image present before changed, FIG. 10B a changed illustration image, and FIG. 10C an illustration image to which the changed illustration image is converted when a new character string is input.

BEST MODE FOR CARRYING OUT THE INVENTION

Referring to FIGS. 1–11, one embodiment of the present invention will be described next.

Figure 1:
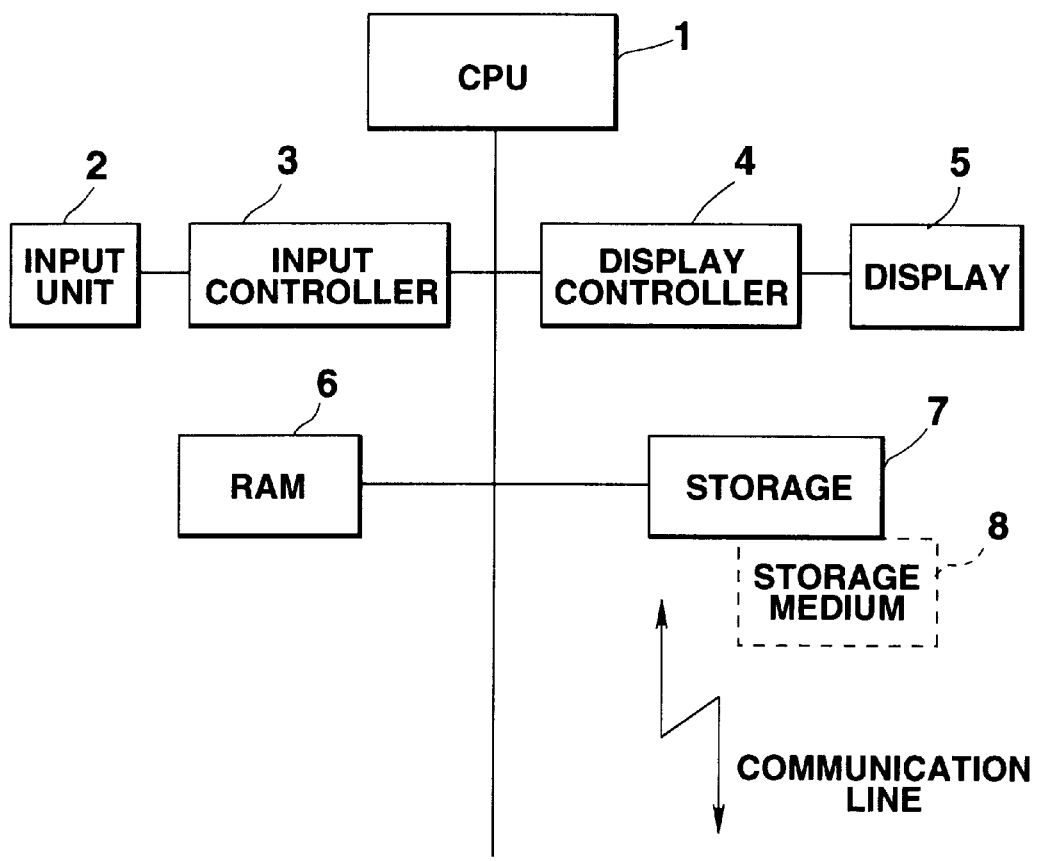
FIG. 1 is a block diagram of the basic structure of a word processor in an embodiment.

FIG. 1 is a block diagram of the basic structure of a word processor having an image processing function. The word processor includes a CPU 1, an input unit 2, an input controller 3, a display controller 4, a display 5, a RAM 6 and a storage 7.

CPU 1 controls the whole operation of the word processor in accordance with various programs contained in the storage 7. CPU 1 receives character string data input from the input unit 2 through the input controller 3, and converts the data to display data, which is then delivered to the display controller 4. The display controller 4 in turn displays the data on a text screen of the display 5 and stores data on a corresponding character string fixed by Japanese kana-to-Chinese character conversion in a text memory 9 of RAM 6.

Figure 2:
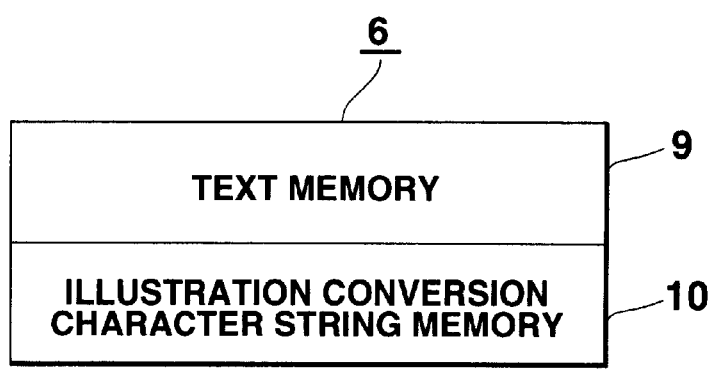
FIG. 2 shows the structure of a RAM.

As shown in FIG. 2, RAM 6 includes the text memory 9 as well as an illustration conversion character string memory 10, which when a character string-to-illustration conversion mode is specified from the input unit 2, temporarily stores the character string fixed by Japanese kana-to-Chinese character conversion as the one to be converted to an illustration image. If a character string which causes us to intuitively associate an illustration which is related to the contents of a document is input by the input unit 2 when the illustration image is to be inserted into the document, CPU 1 temporarily stores the fixed character string in the illustration conversion character string memory 10, refers to an illustration part keyword table 12, an expression form conversion table 13 and a part image arrangement table 14 of the storage 7 on the basis of the contents of the illustration conversion character string memory 10, and calls and combines illustration images from an illustration part image file 15. That is, CPU 1 combines the illustration part images in an illustration pattern synthesis arrangement memory 16 in accordance with arrangement information to be described later, and displays the resulting image.

Figure 3:
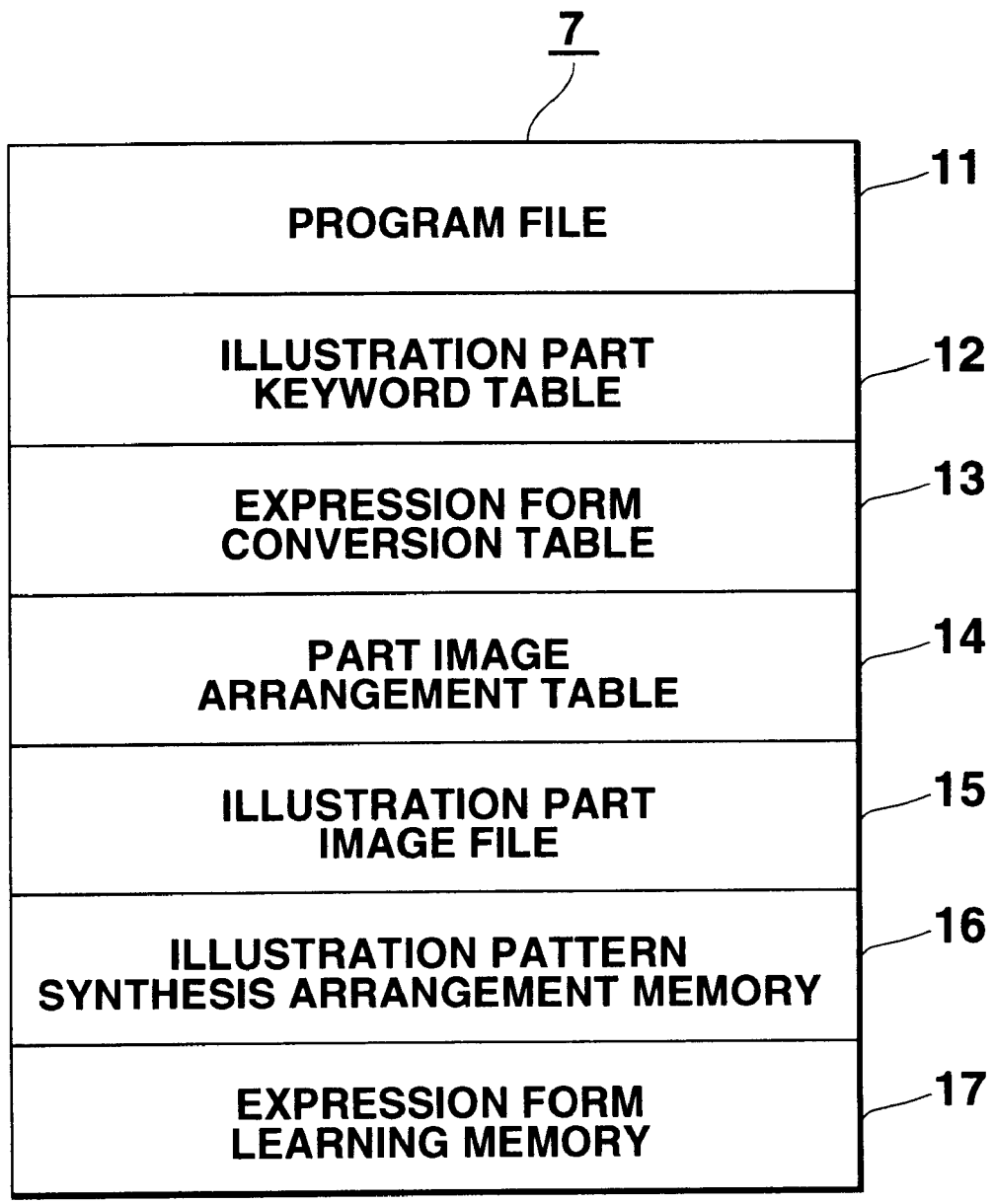
FIG. 3 shows the structure of a storage.

As shown in FIG. 3, the storage 7 is provided with a program file 11 which contains various programs, the illustration part keyword table 12, expression form conversion table 13, part image arrangement table 14, illustration part image file 15, and illustration pattern synthesis arrangement memory 16, and an expression form learning memory 17.

The storage 7 includes a storage medium 8 which contains those programs, data, etc., and which may be a magnetic or optical storage medium or a semiconductor memory provided fixedly or removably in the storage 7.

The program and/or data to be stored in the storage medium 8 may be received from other devices through communication line networks. Alternatively, the storage 7 including the storage medium 8 may be provided in another device connected through a communication line network to the present word processor such that the program and/or data stored in the storage medium may be used through the communication line network.

FIG. 4 illustrates a portion of the illustration part keyword table 12, which contains a plurality of different keywords each expressing an illustration, and one or more part codes specifying illustration part images which compose an illustration expressed by a keyword; for example, standard part codes which specify standard illustration part images "golden folding screen A", "bride A", and "bridegroom A" for a keyword "wedding reception". In addition, the table 12 contains a plurality of other groups of part codes, each group of part codes specifying a corresponding plurality of illustration part images for each illustration with the corresponding plurality of illustration part images each being the same in basic structure as, but different in expression form from, a corresponding standard illustration part image. More specifically, the expression forms are "animation style", "solemn-style", "Japanese style", and "European style" for each keyword. One or more different expression forms may be used for each keyword. For example, for a keyword "donut eating race", the expression forms may be "animation style", "for-female", "for-adult", etc., in addition to the standard style. That is, any expression form may be used for each keyword.

FIG. 5 illustrates a portion of an expression form conversion table 13 which contains input character strings and expression forms in corresponding relationship. For example, all of input character strings "cute", "pop", "animation style", and "cartoon style" correspond to a single expression form "animation style". If any one of those character strings is input, CPU 1 refers to the expression form conversion table 13 to convert the character string to the corresponding expression form "animation-style" and then accesses the illustration part keyword table 12. Similarly, each of input character strings "Japanese style", "ancient style", "Nippon style" and "Nihon style" corresponds to a single expression form "Japanese style". That is, for example, if a character string including "solemn style", "Japanese style" or "European style" is input as words which modify a keyword "wedding reception", the character string is converted to an expression form which corresponds to the modifying words and the illustration part keyword table 12 is accessed. If a character string, for example a modifying word, excluding a keyword, is not input, CPU 1 refers to the expression form learning memory 17 and accesses the illustration part keyword table 12 on the basis of character string data stored in the expression form learning memory 17. The learning memory 17 learns and stores a character string such as modifying words input in the previous character string-to-illustration conversion. For example, if the previous input character string contains the character string "cute", CPU 1 stores this data in the expression form learning memory 17. Even if the input character string contains no data "cute" in the character string-to-illustration conversion to be performed this time, CPU 1 refers to the learning memory 17, accesses the expression form conversion table 13, converts the input character string to an expression form "animation style" as in the previous case, and then accesses the table 12 in accordance with the result of the conversion.

FIG. 6 illustrates a portion of the part image arrangement table 14 in which data on the places and positions of arrangement of various illustration part images, and their image pointer values are stored in correspondence to the respective illustration part codes. For example, for a keyword "wedding reception", a combination of illustration part images in an illustration in which a "bride" and a "bridegroom" sit before a "golden folding screen" is produced. Thus, the order of arrangement of the illustration part image "golden folding screen" is "1(st)", its position of arrangement is in the "center" while the images of arrangement of illustration part images "bride" and "bridegroom" are both "2(nd)", their positions of arrangement are that the "bride" and "bridegroom" are "left" and "right", respectively. CPU 1 accesses the illustration part image file 15 in accordance with image pointer values corresponding to the respective illustration part codes to read and spread corresponding illustration part images in the illustration pattern synthesis arrangement memory 16 in accordance with the order and positions of arrangement of the respective illustration part images.

Figure 7A:
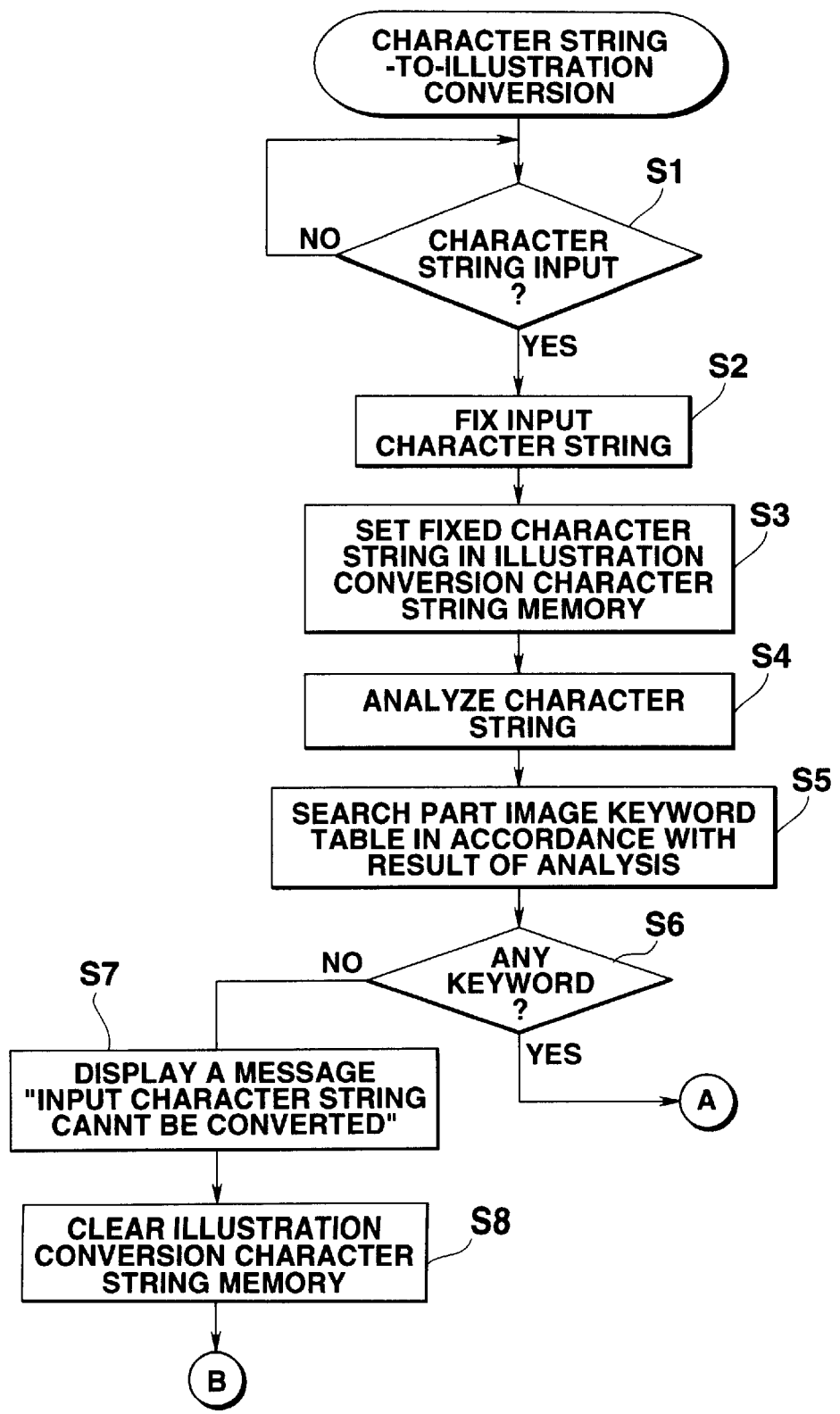
FIGS. 7A–7C are a series of flow charts indicative of the operation of the word processor when a character string-to-illustration conversion mode is specified.
Figure 7B:
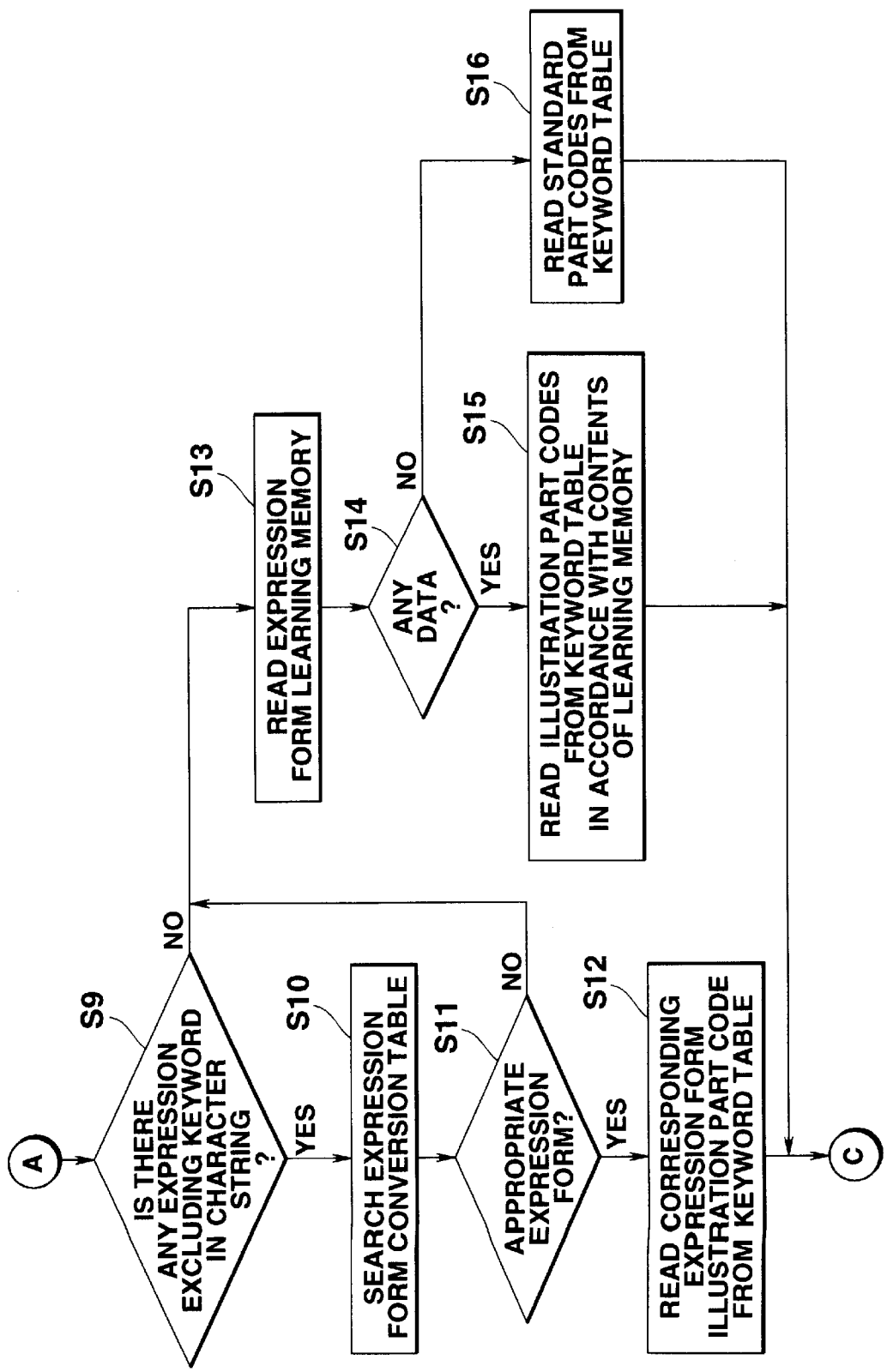
Figure 7C:
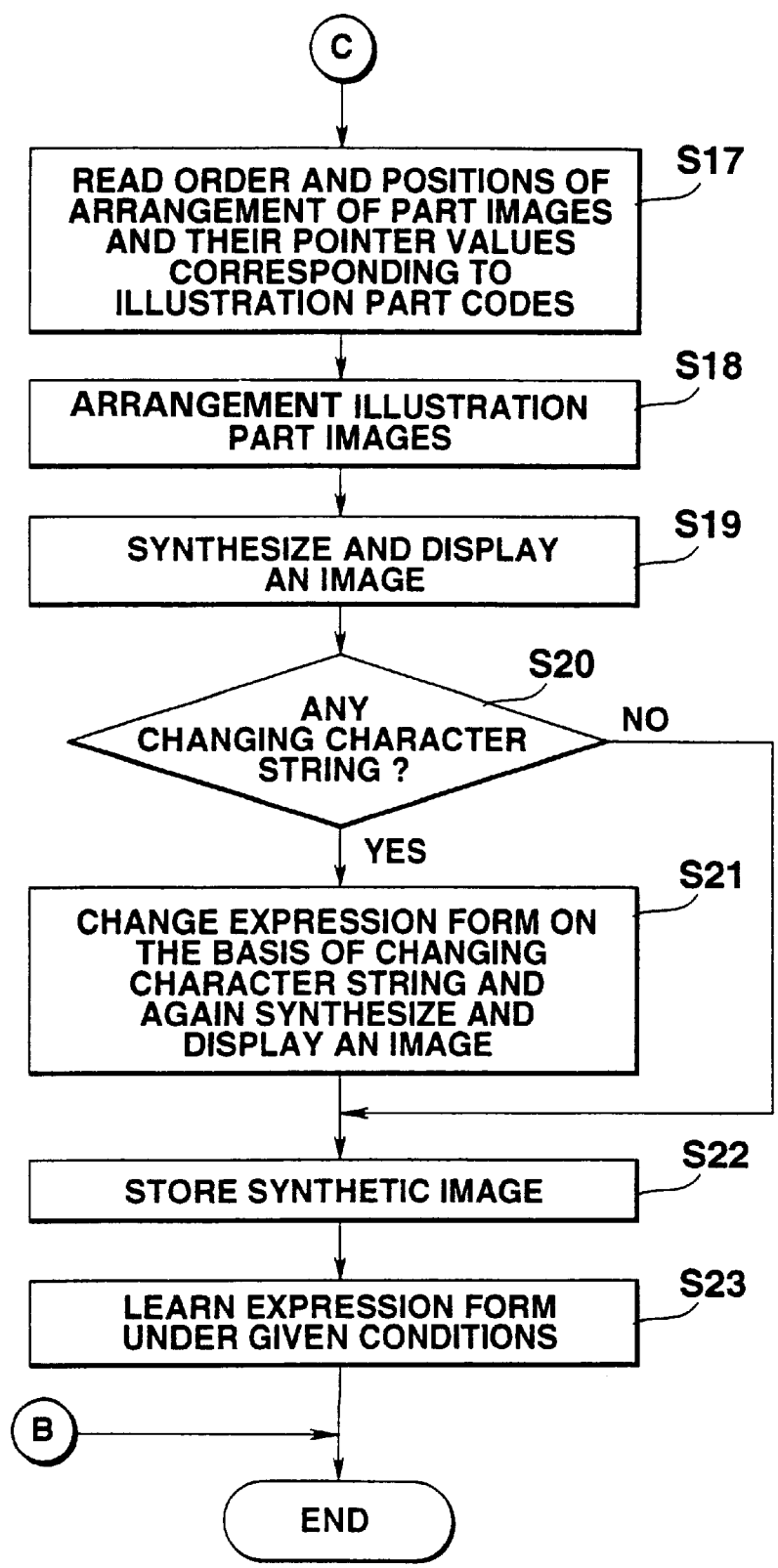

Character string-to-illustration conversion will be described next with reference to flow charts of FIGS. 7A–7C. The programs which realize the respective functions described in the flow charts of FIGS. 7A–7C are stored in the storage medium 8 of the storage 7 in the form of a program code which CPU 1 can read. When a character string-to-illustration conversion mode is specified by operation of a specified key of the input unit 2, CPU 1 starts its processing following the flow charts of FIGS. 7A–7C and waits for the inputting of a character string at the input unit 2 (step S1). When any kana character string which causes us to associate a desired illustration image is keyed in, a kana-to-Chinese character conversion and selection of a conversion candidate are performed on the input kana character string. When the input character string is fixed (step S2), CPU 1 displays and stores this fixed character string into the illustration conversion character string memory 10 (step S3). Alternatively, after the input character string is fixed, the character string-to-illustration conversion mode may be selected.

Then, CPU 1 analyzes the contents of the illustration conversion character string memory 10 (step S4), and searches the illustration part keyword table 12 in accordance with the result of the analysis (step S5). The analysis of the character string in this case involves, for example, extraction of a character string excluding adjectives and/or modifiers and decomposition of the character string into word and idiom units. When the fixed character string is "European style wedding reception", CPU 1 extracts "wedding reception" excluding the modifier "European style", and searches the illustration part keyword table 12 for keyword "wedding reception". When CPU 1 detects that there is no appropriate keyword, it displays a message implying that the input character string cannot be converted (step S7), and clears the contents of the illustration conversion character string memory 10 (step S8). Conversely, if there is the appropriate keyword set in the keyword table 12, control passes to step S9 where CPU 1 checks whether there is data on an expression excluding the keyword in the illustration conversion character string memory 10. Assuming that "European style" is contained for the keyword "wedding reception", the expression form conversion table 13 is searched for that modifier (step S10). As a result, CPU 1 checks whether there is the appropriate expression form in the expression form conversion table 13 (step S11). Since the character string "European style" is set in the table 13, CPU 1 reads data "European style" as an expression form corresponding to the "European style" from the table 13 and retrieves from the keyword table 12 an illustration part code corresponding to that expression form and that keyword (step S12).

In this case, illustration part codes are read which specify "golden folding screen E", "bride E", and "bridegroom E" corresponding to the keyword "wedding reception" and the European style part images, as shown in FIG. 4. Then, CPU 1 searches the part image arrangement table 14 for those respective illustration part codes to thereby read the corresponding image pointer values, and the places and positions of arrangement of the respective illustration part images (step S17). CPU 1 then searches the illustration part image file 15 for desired illustration part image data in accordance with the respective image pointer values. In this case, CPU 1 reads the desired illustration part image data in descending order of arrangement and spreads them on the illustration pattern synthesis arrangement memory 16 in accordance with the positions of arrangement of the illustration part images (step S18). The synthetic image obtained in the illustration pattern synthesis arrangement memory 16 is displayed on the display 5 (step S19). FIG. 8A shows conversion of the input character string "European style wedding reception" to a synthetic illustration image composed of combined different illustration part images. FIG. 8B shows a synthetic illustration image corresponding to a character string "donut eating race" and composed of five combined illustration part images read from the illustration part image file 15 for the standard part images.

Control then passes to step S20 where CPU 1 checks whether the input character string, for example "European style", excluding the keyword has been changed. If not, CPU 1 stores data on the image pointer values, and the order and positions of arrangement of the part images obtained at step S17 at an image insertion position in the text memory 9 (step S22). If there is a modifier indicating an expression form in the character string stored in the illustration conversion character string memory 10, CPU 1 stores the character string indicating that expression form in the expression form learning memory 17 (step S23).

Figure 9A:
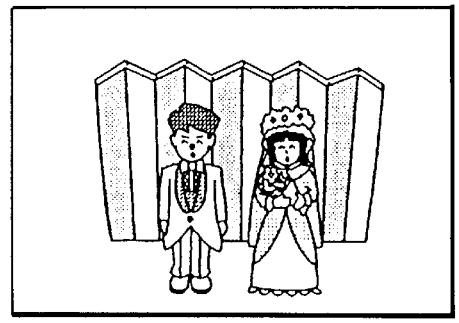
FIGS. 9A and 9B respectively show illustration images present before and after an expression form is changed.
Figure 9B:
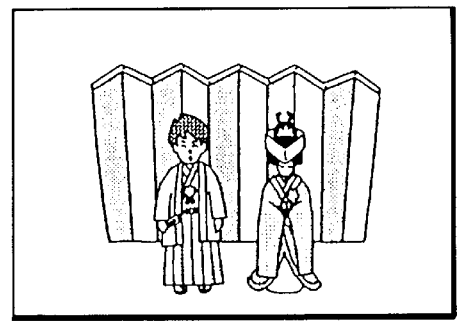

When CPU 1 detects a changed character string at step S20, it changes the expression form on the basis of the changed character string and again performs an image arrangement, synthesis, and display process (step S21). FIGS. 9A and 9B show the course of this process. For example, if the character string "European style" is changed to "A bride and a bridegroom are each dressed in Japanese style", CPU 1 searches the illustration part keyword table 12, expression form conversion table 13, part image arrangement table 14, and illustration part image file 15 for the changed character string to thereby replace the old illustration part images of FIG. 9A with the new illustration part images of the bride and bridegroom dressed in a Japanese style, arranges those new illustration images in the illustration pattern synthesis arrangement memory 16 and displays the contents of the illustration pattern synthesis arrangement memory 16. Thus, the new or changed illustration part images are each displayed dressed in Japanese style, as shown in FIG. 9B.

When CPU 1 detects at step S9 that no expression excluding the keyword is contained in the illustration conversion character string memory 10, for example, when the keyword "wedding reception" alone is set in the illustration conversion character string memory 10 and no character string indicative of an expression form such as "European style" is contained, control passes to step S13, where CPU 1 reads data in the expression form learning memory 17. The expression form learning memory 17 learns and stores a character string indicative of an expression form input in the character string-to-illustration conversion performed last time or before the last time. Since no data is stored in the expression form learning memory 17 at the start-up of the system, CPU 1 detects that fact at step S14. In response to this operation, control passes to step S16, where CPU 1 reads standard part codes on the basis of the keyword input this time from the illustration part keyword table 12. If there is data in the expression form learning memory 17, CPU 1 reads part codes of an expression form corresponding to the data in the expression form learning memory 17 from the illustration part keyword table 12 (step S15).

Figure 10A:
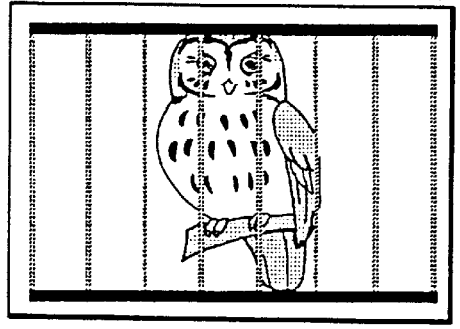
Figure 10B:
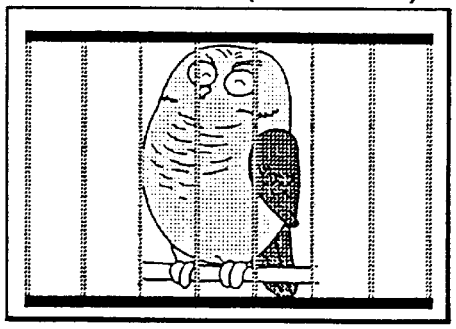
Figure 10C:
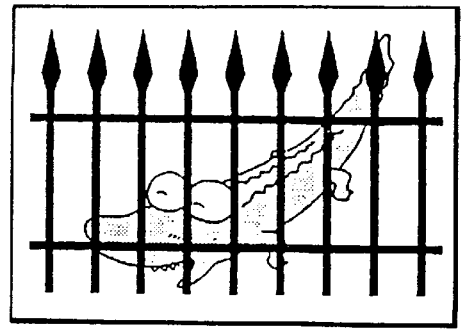
Figure 11:
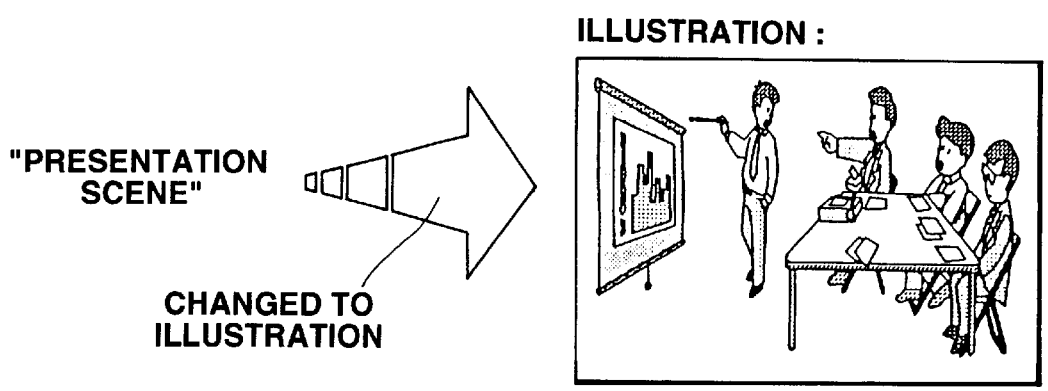
FIG. 11 shows a synthetic illustration image as a modification of the invention.

Similarly, CPU 1 reads image pointer values and arrangement information from the part image arrangement table 14 on the basis of the illustration part codes read from the illustration part keyword table 12 (step S17), arranges and synthesizes the illustration part image data, read from the illustration part image file 15 in accordance with the read pointer values, in the illustration pattern synthesis arrangement memory 16 in accordance with the arrangement information, and displays the resulting image (step S18, S19). FIGS. 10A–10C show display screens in this case. Assuming that, for example, in the previous character string-to-illustration conversion, a character string "An owl in a zoo" is converted to a synthetic illustration image composed of the standard part images, as shown in FIG. 10A, and then a character string "cute" indicative of a style of expression is input to change the expression form of the illustration image of FIG. 10A (step S20), the synthetic image composed of those standard part images is converted to an animation style one on the basis of the changing character string, as shown in FIG. 10B (step S21). Then, data on the expression form "cute" is stored in the expression form learning memory 17. Thus, if, for example "An alligator in a zoo" is input in the character sting-to-illustration conversion to be performed this time, CPU 11 detects at step S14 that there is data in the expression form learning memory 17. Thus, as shown in FIG. 10C, the CPU displays a synthetic illustration image which expresses "An alligator in a zoo" in a "cute" style of expression form. Thus, for example, when a plurality of synthetic illustrations is inserted into a document, the respective styles of expression of the synthetic illustration images are unified even when the respective character strings each indicative of an expression form are not input. In order to obtain a style of expression of the synthetic illustration image different from the previous one, a changing character string different from the previous one is required to be input, as in the above case (step S21).

As described above, in this embodiment, the illustration part keyword table 12 which contains a plurality of illustration part codes for each keyword and the part image arrangement table 14 which contains information on the arrangement of illustration part images and their image pointer values in correspondence to the illustration part codes are provided. CPU 11 searches the illustration part keyword table 12 and the part image arrangement table 14 on the basis of a keyword of the input character string and reads a plurality of illustration part images corresponding to the keyword from the illustration part image file 15, disposes and combines the respective illustration part images in the illustration pattern synthesis arrangement memory 16 in accordance with the arrangement information, and displays the resulting synthetic image. Thus, the desired synthetic illustration image is easily obtained in a simple operation.

Since a plurality of illustration part images, different in expression form and hence in style of expression from another one, is stored in addition to the corresponding standard illustration part images in the illustration part keyword table 12, and when a character string indicative of an expression form is contained in the input character string, illustration part images having a style of expression depending on the expression form are selected, combined and displayed. Thus, only by inputting a character string indicative of an expression form along with a keyword, a synthetic illustration image having the style of expression is obtained.

If a synthetic illustration image having any style of expression has been displayed and a character string which changes the expression form thereof is input, the expression form of the synthetic image is changed to the one having the style of expression depending on the changing character string. Thus, no new character string including a keyword is required to be newly input, but a character string to change only a portion of the input character string is required to be input to obtain a synthetic illustration image having a desired style of expression.

Since the expression form learning memory 17 is provided, a synthetic illustration image to be produced this time can be expressed in a style of expression similar to that included in the character string input last time or before the last time. Thus, when a plurality of synthetic illustration images is to be inserted into a document, the respective synthetic images are unified in style of expression even when no character string indicative of an expression form is required to be input each time an individual synthetic illustration image is input.

When expression form data is input, the input data can have a margin because of provision of the expression form conversion table 13. Thus, any expression form data stored in the expression form conversion table 13 can be converted to a corresponding predetermined one, so that the inputting operation is further simplified.

As just described above, while in the embodiment a certain margin is given to an expression form to be input because of provision of the expression form conversion table 13, a margin may be given likewise to a keyword to be input. For example, if any one of "presentation", "presentation scene", "scheme explanation meeting" and "meeting" is input as a keyword to obtain a synthetic illustration image "presentation scene" of FIG. 11, the appropriate illustration image may be produced and output.

What is claimed is:

1. An image processor for reading and outputting image data, comprising:

image data storage means for storing a plurality of image data pieces;

image combining information storage means for storing image combining information sets each including pointer information pieces and arrangement information pieces, which are used in accessing predetermined image data pieces of the plurality of image data pieces, the pointer information pieces being associated with the arrangement information pieces, respectively, the image combining information sets being associated with keywords, respectively;

input means for inputting a keyword;

reading means for retrieving data stored in the image combining information storage means in response to the keyword input by the input means, to thereby read those printer information pieces of the pointer information pieces which are associated with the input keyword, and those arrangement information pieces of the arrangement information pieces which are associated with the input keyword; and output means for reading those image data pieces of the image data pieces, which are associated with the pointer information pieces read out by the reading means, from the image data storage means, and combining the read image data pieces such that the combined image data pieces are arranged in accordance with the arrangement information pieces read by the reading means.

2. An image processor according to claim 1, wherein the arrangement information pieces stored in the image combining information storage means are information pieces regarding positions in an arrangement order and arrangement positions with respect to the image data pieces, respectively, and the output means, when outputting the image data pieces, combines the image data pieces in accordance with the positions in the arrangement order and outputs the combined image data pieces such that the combined image data pieces are arranged in the arrangement positions.

3. An image processor for reading and outputting image data, comprising:

image data storage means for storing a plurality of image part information pieces each including a plurality of image data pieces whose image expression forms are different;

image combining information storage means for storing image combining information sets each including arrangement information pieces and predetermined image part information pieces included in the plurality of image part information pieces, the predetermined image part information pieces being associated with the arrangement information pieces, respectively, the image combining information sets being associated with keywords, respectively;

input means for inputting a keyword;

designating means for designating one of the image expression forms;

reading means for retrieving data stored in the image combining information storage means in response to the keyword input by the input means, to thereby read those image part information pieces which are associated with the input keyword, and those arrangement information pieces which are associated with the input keyword; and output means for combining image data pieces which are included in the image part information pieces read by the reading means, and whose image expression form is the same as said one of the image expression forms which is designated by the designating means, and outputting combined image data pieces such that the combined image data pieces are arranged in accordance with the arrangement information pieces associated therewith.

4. An image processor according to claim 3, wherein when the combined image data pieces have been output such that the combined image data pieces are arranged, and the designating means designates another one of the image expression forms to effect a change from said one of the image expression forms to said another one of the image expression forms, the output means converts image part information pieces constituting the combined image data pieces which have been output, into image data pieces whose image expression form is the same as said another one of the image expressions forms, and then outputs the image data pieces.

5. An image processor according to claim 3, wherein:

the designating means designates one of the image expression forms by inputting a character string indicative of said one of the image expression forms, and includes a learning memory for storing said one of the image expression forms when the character string is input by the designating means, and wherein when a new keyword is input to designate an image output, the output means combines image data pieces which are included in the image part information pieces read by the reading means, and whose image expression form is the same as said one of the image expression forms which is stored in the leaning memory, and outputs the combined image data pieces such that the combined image data pieces are arranged in accordance with the arrangement information pieces associated therewith.

6. An image processor for reading and outputting image data, comprising:

image combining information storage means for storing image combining information sets each including a keyword, a plurality of image data pieces and arrangement information pieces necessary for outputting the plurality of image data pieces such that the plurality of image data pieces are arranged, respectively;

input means for inputting a keyword;

reading means for reading from the image combining information storage means, the image data pieces and the arrangement information pieces which are included in the image combining information set including the keyword input by the input means; and output means for combining the image data pieces read by the reading means and outputting combined image data pieces such that the combined image data pieces are arranged in accordance with the arrangement information pieces read along with the image data pieces by the reading means, wherein said image combining information storage means stores a plurality of expression forms, a plurality of image data pieces for each expression form and for each keyword, and wherein when a character string indicative of an expression form of an image is input along with any particular one of the keywords by the input means, the reading means reads a plurality of image data pieces corresponding to the input keyword and expression form.

7. A medium containing a program code and data code, both readable by a computer for enabling an image processor to read and output data, comprising:

an image information data code including image combining information sets each having a keyword, a plurality of image data pieces and arrangement information pieces necessary for outputting the plurality of image data pieces such that the plurality of image data pieces are arranged, respectively;

an input program code for inputting a keyword;

a read program code for use in reading the image data pieces and the arrangement information pieces with the image information data code, which are included in the image combining information set including the keyword input with the input program code; and an arrangement program code for combining the read image data pieces read with the read program code and outputting combined image data pieces such that the combined image data pieces are arranged in accordance with the arrangement information pieces read with the image data pieces.

8. A medium containing a program code and a data code, both readable by a computer for enabling an image processor to read and output data, comprising;

an image information data code combining image combining information sets each including a keyword and a plurality of image data pieces which are classified into groups respectively associated with image expression forms;

an input program code for use in inputting a keyword;

a designation program code for use in designating one of the image expression forms;

an expression form read program code for use in reading, from the image information data code, those image data pieces of the image data pieces included in the image combining information set including the keyword input with the input program code, which are classified into the group associated with said one of the image expression forms which is designated with the designation program code; and an arrangement program code for combining the image data pieces read with the expression form read program code such that combined image data pieces are arranged and output.

9. A medium containing computer-readable program codes for enabling an image processor to read and output data, comprising:

a program code for storing a plurality of image data pieces;

a program code for storing image combining information sets each having pointer information pieces and arrangement information pieces, which are used in accessing predetermined image data pieces of the plurality of image data pieces, the pointer information pieces being associated with the arrangement information pieces, respectively, the image combining information sets being associated with keywords, respectively;

a program code for inputting a keyword;

a program code for retrieving the stored image combining information in response to the input keyword, to thereby read those printer information pieces of the pointer information pieces which are associated with the input keyword, and those arrangement information pieces of the arrangement information pieces which are associated with the input keyword;

a program code for reading those image data pieces which are associated with the read pointer information pieces, from the image data storage means, and combining the read image data pieces such that the combined image data pieces are arranged in accordance with the read arrangement information pieces.

10. A medium containing computer-readable program codes for enabling an image processor to read and output data, comprising:

a program code for storing a plurality of image part information pieces each including a plurality of image data pieces whose image expression forms are different;

a program code for storing image combining information sets each including arrangement information pieces and predetermined image part information pieces included in the plurality of image part information pieces, the predetermined image part information pieces being associated with the arrangement information pieces, respectively, the image combining information sets being associated with keywords, respectively;

a program code for inputting a keyword;

a program code for designating one of the image expression forms;

a program code for retrieving the stored image combining information in response to the input keyword, to thereby read those image part information pieces which are associated with the input keyword, and those arrangement information pieces of the arrangement information pieces which are associated with the input keyword; and a program code for combining image data pieces which are included in the read image part information pieces, and whose image expression form is the same as said one of the image expression forms which is designated, and outputting combined image data pieces such that the combined image data pieces are arranged in accordance with the arrangement information pieces associated therewith.

* * * * *